United States Patent [19]
Buelt et al.

[11] Patent Number: 5,316,411
[45] Date of Patent: May 31, 1994

[54] APPARATUS FOR IN SITU HEATING AND VITRIFICATION

[75] Inventors: James L. Buelt, Richland, Wash.; Kenton H. Oma, Mount Juliet, Tenn.; Eugene A. Eschbach, Richland, Wash.

[73] Assignee: Battelle Memorial Institute, Richland, Wash.

[21] Appl. No.: 994,172

[22] Filed: Dec. 21, 1992

Related U.S. Application Data

[60] Continuation of Ser. No. 665,776, Mar. 7, 1991, which is a continuation-in-part of Ser. No. 531,890, Jun. 1, 1990, abandoned, which is a division of Ser. No. 181,635, Apr. 14, 1988, Pat. No. 4,957,393.

[51] Int. Cl.$^5$ .......................... E02D 3/00; E02D 3/11
[52] U.S. Cl. .................................. 405/128; 166/248; 405/131
[58] Field of Search ............... 405/128, 129, 131, 258, 405/303; 219/10.81; 166/248, 245; 299/14–16

[56] References Cited

U.S. PATENT DOCUMENTS

| | | | |
|---|---|---|---|
| 1,512,125 | 10/1924 | Mende | 404/79 |
| 1,715,970 | 6/1929 | Williams | 405/50 X |
| 1,966,760 | 7/1934 | Irvine | 404/79 |
| 1,993,642 | 3/1935 | Aarts et al. | 175/16 |
| 2,099,328 | 11/1937 | Casagrande | 166/248 X |
| 2,308,860 | 1/1943 | Clark | 175/16 |
| 2,448,886 | 9/1948 | Hopkins | 13/9 |
| 2,795,279 | 6/1957 | Sarapuu | 166/11 |
| 2,821,611 | 1/1958 | Mann et al. | 219/10.81 X |
| 3,106,244 | 10/1963 | Parker | 166/11 |
| 3,137,347 | 6/1964 | Parker | 166/39 |
| 3,169,577 | 2/1965 | Sarapuu | 166/42 |
| 3,208,674 | 9/1965 | Bailey | 299/14 X |
| 3,417,823 | 12/1968 | Faris | 166/248 |
| 3,916,993 | 11/1975 | Katz | 166/248 |
| 3,972,372 | 8/1976 | Fisher et al. | 166/248 |
| 3,988,036 | 10/1976 | Fisher et al. | 299/14 X |
| 4,084,638 | 4/1978 | Whiting | 166/248 |
| 4,193,451 | 3/1980 | Dauphine | 166/248 |
| 4,196,329 | 4/1980 | Rowland et al. | 219/10.81 |
| 4,320,801 | 3/1982 | Rowland et al. | 166/248 |
| 4,376,598 | 3/1983 | Brouns et al. | 405/129 X |
| 4,382,469 | 5/1983 | Bell et al. | 166/248 |
| 4,412,124 | 10/1983 | Kobayashi | 219/277 |
| 4,424,149 | 1/1984 | Bege et al. | 252/626 X |
| 4,473,114 | 9/1984 | Bell et al. | 166/248 |
| 4,495,990 | 1/1985 | Titus et al. | 166/65 |
| 4,498,535 | 2/1985 | Bridges | 219/10.81 X |
| 4,518,399 | 5/1985 | Croskell et al. | 405/129 X |
| 4,579,391 | 4/1986 | Mouat et al. | 166/248 X |
| 4,581,163 | 4/1986 | Meininger et al. | 252/626 X |
| 4,645,004 | 2/1987 | Bridges et al. | 166/248 |
| 4,651,825 | 3/1987 | Wilson | 166/248 X |
| 4,665,305 | 5/1987 | Shirazawa et al. | 219/277 |
| 4,670,148 | 6/1987 | Schneider | 405/129 X |
| 4,670,634 | 6/1987 | Bridges et al. | 299/14 X |
| 4,697,532 | 10/1987 | Furukawa et al. | 110/346 |
| 4,716,960 | 1/1988 | Eastlund et al. | 166/60 |
| 4,956,535 | 9/1990 | Buelt et al. | 405/258 X |
| 5,004,373 | 4/1991 | Carter | 405/128 X |
| 5,024,556 | 6/1991 | Timmerman | 405/128 |
| 5,065,819 | 11/1991 | Kasevich | 405/128 X |
| 5,076,727 | 12/1991 | Johnson et al. | 405/128 |

FOREIGN PATENT DOCUMENTS

| | | | |
|---|---|---|---|
| 1166151 | 4/1984 | Canada | 166/39 |
| 1059846 | 6/1959 | Fed. Rep. of Germany | |
| 1320921 | 4/1963 | France | 405/258 |
| 0692933 | 10/1979 | U.S.S.R. | 405/258 |
| 0927898 | 5/1982 | U.S.S.R. | 405/131 |
| 1004528 | 3/1983 | U.S.S.R. | 405/258 |
| 1139799 | 2/1985 | U.S.S.R. | 405/258 |
| 0756582 | 9/1956 | United Kingdom | 55/2 |

*Primary Examiner*—Dennis L. Taylor
*Attorney, Agent, or Firm*—Dellett and Walters

[57] ABSTRACT

An apparatus for decontaminating ground areas where toxic chemicals are buried includes a plurality of spaced electrodes located in the ground and to which a voltage is applied for bringing about current flow. Power delivered to the ground volatilizes the chemicals that are then collected and directed to a gas treatment system. A preferred form of the invention employs high voltage arc discharge between the electrodes for heating a ground region to relatively high temperatures at relatively low power levels. Electrodes according to the present invention are provided with preferentially active lower portions between which current flows for the purpose of soil heating or for soil melting and vitrification. Promoting current flow below ground level avoids predominantly superficial treatment and increases electrode life.

31 Claims, 11 Drawing Sheets

5,316,411

APPARATUS FOR IN SITU HEATING AND VITRIFICATION

The invention was made in part with government support under contract number DE-AC06-76RLO 1830, awarded by the U.S. Department of Energy. The government has certain rights in the invention.

This application is a continuation of application Se. No. 07/665,776, filed Mar. 7, 1991, which was a continuation-in-part of application Ser. No. 07/531,890, filed Jun. 1, 1990, now abandoned, which was a division of application Ser. No. 07/181,635, filed Apr. 14, 1988, now U.S. Pat. No. 4,957,393.

BACKGROUND OF THE INVENTION

A substantial number o ground contaminated areas exist, especially as the result of industrial disposal, which either threaten populated areas or which cannot be used for conventional purposes. Temporary storage methods and or/soil heating techniques have been proposed for treating contaminated soils containing dioxins, PCB'S, hydrocarbons and the like. Soil heating can drive off volatile substances but some methods of heating the soil, e.g. radio frequency heating, can be expensive or incapable of heating to the desired depth for removing large quantities of contaminants. In Brouns et al U.S. Pat. No. 4,376,598, in situ vitrification of soil is described wherein sufficient electrical energy is applied via electrodes in the ground for converting the soil itself to a conductive, i.e., liquid, state which is then allowed to harden into a vitrified mass. According to the latter method, non-volatile contaminant substances are stabilized as vitrified material, and volatile materials are driven off or pyrolyzed. However, electrical power requirements in melting the soil can be substantial.

For the purpose of carrying out complete in-situ vitrification of the soil, or in heating of the soil to temperatures for driving off contaminants, pairs of metal electrodes can be driven into the ground and connected to a source of power. Electrical discharge or current flow then tends to take place at the surface, whereby a relatively large area is liquefied or treated near ground level, but lower regions are less effectively penetrated. Lower melted soil resistance encountered near the surface during in-situ vitrification is believed to promote spreading of the treatment area adjacent the surface as compared with treatment to a greater depth. Subjecting the electrodes to high operating temperatures and corrosive environments for extended periods of time reduces electrode life. The electrodes can deteriorate rapidly as a result of emphasizing surface treatment because of oxidation as well as because of diffusion of materials into the electrodes, recrystallization of the electrode material, and/or metal reduction and pitting.

SUMMARY OF THE INVENTION

In accordance with an aspect of the present invention, electrodes are provided which position the electrical discharge or current flow in the ground at a level which is substantially adjacent the surface, but which avoids predominantly superficial treatment and electrode deterioration. In accordance with one embodiment, an electrode insulating sleeve is provided in such manner that electrical discharge takes place, at least initially, below the ground level. In other embodiments, electric current is switched between portions of an electrode, or meltable fuse-like portions force the current flow downwardly. In yet another embodiment, a selective connecting member is slidable within an electrode.

Apparatus according to one aspect of the present invention is used to heat a region of ground containing volatilizable material to a temperature below its melting temperature by applying a voltage to a pair of electrodes spanning the region for causing a current flow therebetween. In accordance with this embodiment, a voltage between electrodes is applied in a range of 100-2,000 kilovolts DC for heating the region by intermittent DC arcing. A high voltage impulse generator is preferably employed which causes direct current discharges between electrodes, separated by short time periods to permit any ionized gases to recombine. This system enables the delivery of effective power to the ground at reasonable power levels for heating the ground to the required temperature for volatilizing undesired material.

In accordance with another aspect of the present invention, a plurality of electrodes are inserted in the ground, and a power supply is switched between various pairs of electrodes. According to a further aspect of the invention, a negative pressure is maintained with respect to the treated region of ground by means of a hood over the ground surface being treated or hollow electrodes through which the volatilized material is withdrawn by an induced draft or vacuum source.

It is therefore an object of the present invention to provide an improved apparatus for detoxifying sites containing hazardous volatilizable materials.

It is another object of the present invention to provide an improved electrode for vitrifying or detoxifying sites containing hazardous materials while avoiding entirely superficial treatment.

It is another object of the present invention to provide an improved electrode for vitrifying or detoxifying sites containing hazardous materials wherein treatment can be directed to a given level.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DRAWINGS

FIG. 1 is a top view of an in situ heating hood apparatus carrying a number of electrodes, FIG. 2 is a side view of the FIG. 1 apparatus, FIG. 3 is a vertical, cross-sectional view of an electrode according to the present invention, FIG. 4 is a side view of in situ heating apparatus, including plural hollow electrodes and a common header, FIG. 5 is a cross-sectional view, partially broken away, of a FIG. 4 electrode, FIG. 6 is an electrical circuit diagram of power supply apparatus employed with the present invention including switching means for plural electrodes, FIG. 7 is a schematic illustration of gas treatment means as may be employed with the present invention, FIG. 8 is a top view of an in-situ vitrification hood apparatus, FIG. 9 is a side view of the FIG. 8 apparatus, FIG. 10 is a side view illustrating vitrification of soil, FIG. 11 is a vertical, cross-sectional view of a further electrode according to the present invention, FIG. 12 is a lateral cross section of the FIG. 11 electrode, FIG. 13 is a vertical, cross-sectional view of another electrode according to the present invention, FIG. 14 is a vertical, cross-sectional view of yet another electrode according to the present invention, and FIG. 15 is a vertical, cross-sectional view of a still further electrode according to the present invention.

DETAILED DESCRIPTION

Figure 1:
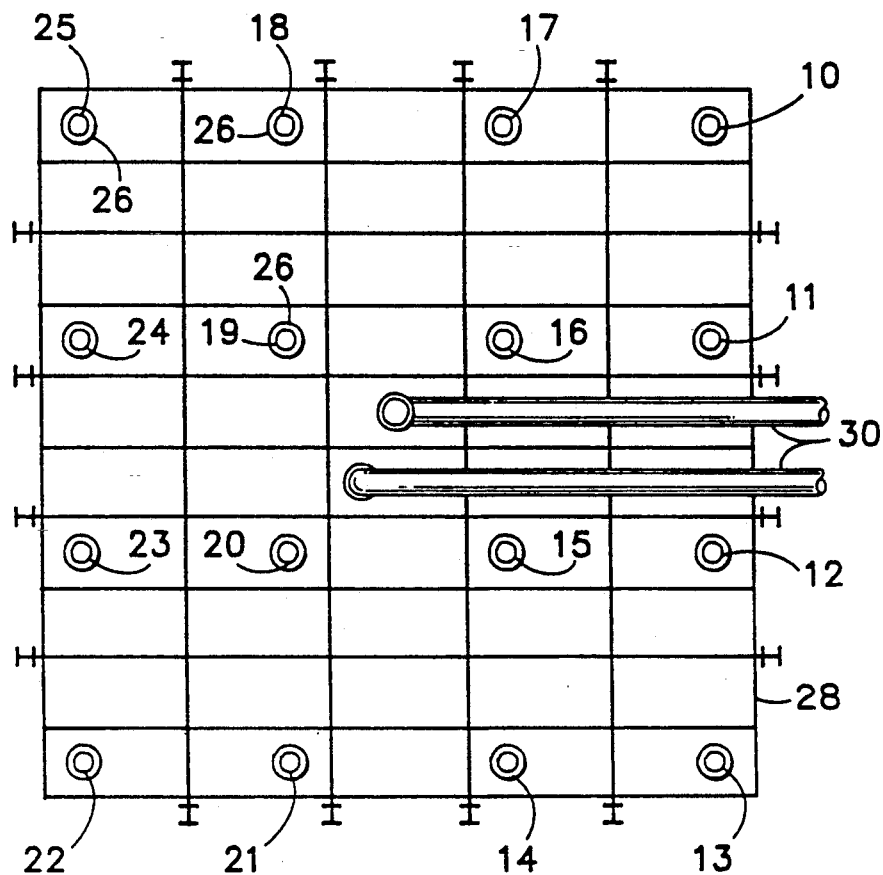
Figure 2:
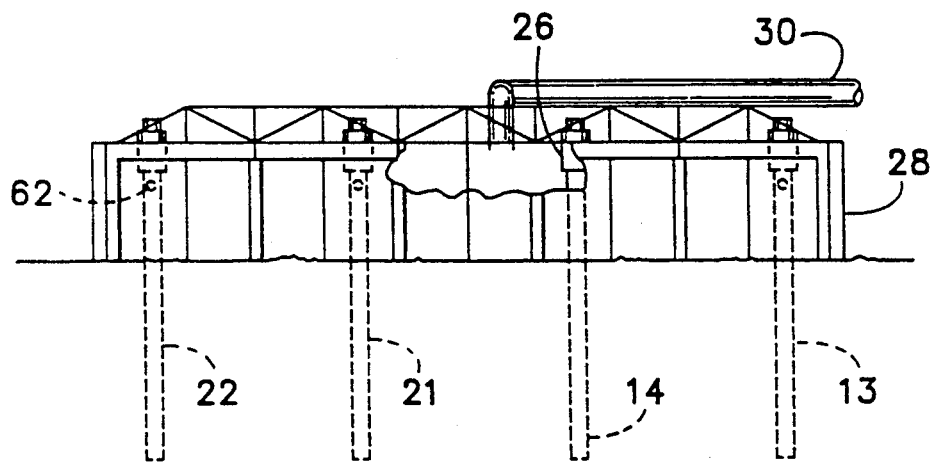

Referring to the drawings, and particularly to FIGS. 1 and 2 illustrating soil heating apparatus according to the invention, a plurality of substantially vertically disposed electrodes 10-25 are slideably supported via insulating feedthroughs 26 from the roof of portable hood 23. Hood 28 is movable with respect to the ground and may be placed over a region containing hazardous material which is to be removed. The hood is also equipped with off-gas outlet 30 connected with the top interior of the hood which suitably leads to a gas treating, recovery, and/or destruction system.

The electrodes 10–25 are either driven into the ground or the ground is predrilled for their reception at locations within the underground area containing hazardous materials. The electrodes are connected to a power system that suitably builds an increasing charge amongst the electrodes until arcing discharge occurs. At the point of electrical discharge, heat is generated in the soil for raising its temperature.

Figure 6:
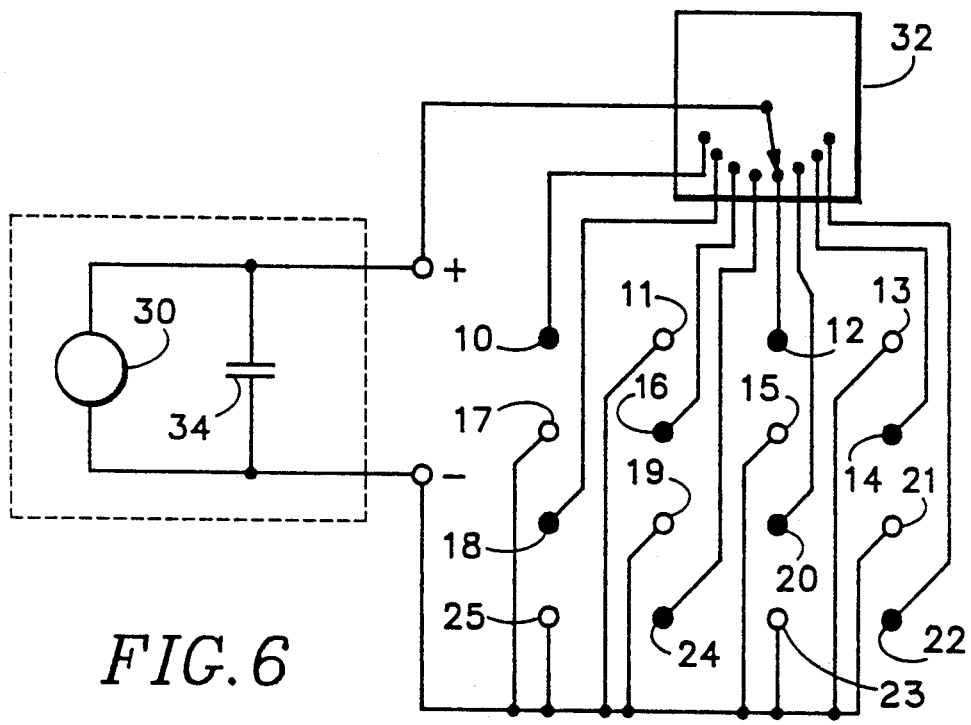

The electrodes are suitably connected to a power supply in the manner illustrated in FIG. 6 such that, for example, even numbered electrodes are connected or connectable to the positive side of the source and the odd numbered electrodes are connected or connectable to the negative side. The electrodes are evenly spaced, for example, in a 4×4 array as shown, so that each positive electrode is equally spaced from at least a pair of negative electrodes. Switching means 32 is employed for cyclically energizing positive electrodes 10, 12, 14, 16, 18, 20, 22 and 24 from the positive power supply terminal while the negative electrodes remain connected to the negative power supply terminal. Therefore, at least pairs of electrodes are sequentially actuated for initiating conduction in the ground between such pairs. Alternative switching means are clearly possible, i.e., a switching means similar to means 32 may be interposed between the negative power supply terminals and the respective odd numbered electrodes. The power system should be capable of delivering a voltage between 100 and 2,000 kilovolts to provide intermittent electrical discharges for heating the soil to temperatures above 200° C. High voltage impulse generators can be used and are commercially available.

The power supply utilized in FIG. 6 is an impulse generator represented by direct current source 30 and a capacitor bank 34 connected across the terminals of DC source 30. The supply is capable of delivering a high DC voltage in the range of 100-2,000 kilovolts. When the capacitor bank charges to a predetermined level, a discharge takes place in the ground between a pair of electrodes, e.g. between electrode 12 and one or more of electrodes 11, 14, and 15 for the switch position shown. After substantial discharge of capacitor bank 34, the capacitor bank recharges from source 30 until the next discharge takes place between the same electrodes, or other electrodes if the position of switch 32 has been changed.

Generally, the position of switch 32 is maintained for directing sequential discharges between a pair or pairs of electrodes until such electrodes reach a predetermined temperature level after which switch 32 is moved to the next position. Thus, switch 32 is suitably actuated by a timing mechanism (not shown) so that a given positive electrode will support, for example, ten arc discharges before the next positive electrode in sequence is selected. Typically a period of one second occurs between discharges which allows for gas recombination. The discharge voltage for the circuit of FIG. 6 is primarily dependent upon the spacing of the electrodes, as well as to some degree the type of soil therebetween.

Although applicable to all soil types, the heating system according to the present invention is most economically employed in regions of dry, sandy soil. As capacitor bank 34 charges, a voltage will be reached for which a discharge will be initiated between selected electrodes. Clearly the circuit can be modified, if desired, to insert additional switching means between capacitor bank 34 and the electrode array such that discharge between electrodes is initiated at a selected voltage level, preferably between 100 kv and 2,000 kv.

For the FIG. 6 circuit as illustrated, if moisture is present in the soil to any great extent, a steady current can first pass through water in the soil, driving off water vapor by resistance heating. As the soil begins to develop non-conductive dry spots, the voltage across the capacitor bank increases further and repetitive arcing through the soil begins. The charge-discharge cycle then continues to impart energy to the soil, heating the soil and driving off the volatiles. Once the soil adjacent the electrodes is dried, the arcing will usually provide higher voltage and higher power input to the soil than the resistive heating.

Figure 3:
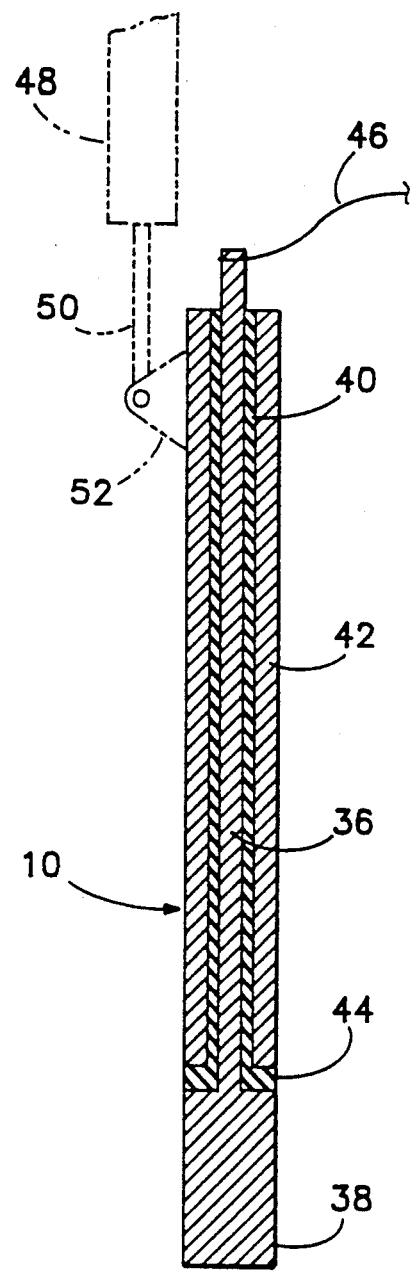

Although steel or aluminum rods can be used as electrodes in the system for heating the soil, a preferred electrode for the above-described soil heating apparatus is illustrated in longitudinal cross section at 10 in FIG. 3. The electrode is cylindrical, having an inner axial electrode portion 36 suitably formed of carbon steel or aluminum and provided with an enlarged cylindrical tip 38 at its lower extremity. The inner axial portion 36 is covered by an insulating sleeve 40 formed of a high voltage insulating material such as preformed mica. Disposed over insulting sleeve 40 is a further metal sleeve 42, suitably carbon steel or aluminum, having the same outside diameter as electrode tip 38 but separated from tip 38 by radial flange 44 of insulating sleeve 40, the last mentioned flange also having the same outside diameter as tip 38. The metal sleeve 42 may be partially or fully withdrawn after the electrode assembly 10 is driven or inserted into the ground in the case of the soil heating system to eliminate the possibility of electric arcing between the electrode tip 38 and metal sleeve 42.

Central portion 36 extends a distance outwardly above sleeves 40 and 42 for receiving electrical connection 46 which may lead to switching means 32 in FIG. 6. Electrical connection 46, as well as the protruding part of electrode portion 36, are suitably covered by high voltage shrink plastic insulation (not shown) rated at 100 kv or greater. An example is shrink-fit Okanite material. The voltage required to arc through dry soil is found to be greater than that required for arcing through air and it is therefore necessary to provide electrical insulation above the soil to prevent unwanted arcing. Alternatively, or in addition, pairs of arcing electrodes may be disposed in angular relation to one another rather than vertically as depicted in FIG. 2. For instance, the lower tips of electrodes 13 and 14 may be angled closer to one another with the upper portions farther apart.

Insulating the upper part of the electrode provides a means for concentrating electrical arcing at a given level below the ground into which the electrode is driven. At the same time, sleeve 42 and flange 44 suitably have the same outer diameter as tip 38 to facilitate driving or insertion of the electrode into the ground. Assuming it is desired to initiate electrical discharge at a fairly low ground level, followed by raising the level of discharge so as to sweep through a given ground region, electrodes of the type illustrated in FIG. 3 may be gradually or intermittently raised after performing desired heating at different levels. The power supply of FIG. 6 may be periodically deactivated and the capacitor bank discharged, after which the electrodes are raised manually from the top of hood 28 by sliding the same upwardly through insulators 26. After adjusting the levels of various electrodes to a higher level, arcing operation can be resumed. Alternatively, each electrode is suitably supplied with means for raising the same. Referring to FIG. 3, a hydraulic cylinder 48 which is mounted to the frame of hood 28 (by means not shown) is provided with an actuating rod 50 pivotally engaging a bracket 52 secured to the outer metal sleeve 42 locked to an electrode. The hydraulic cylinder 48 is periodically or continuously actuated to gradually move the electrode assembly upwardly.

Figure 4:
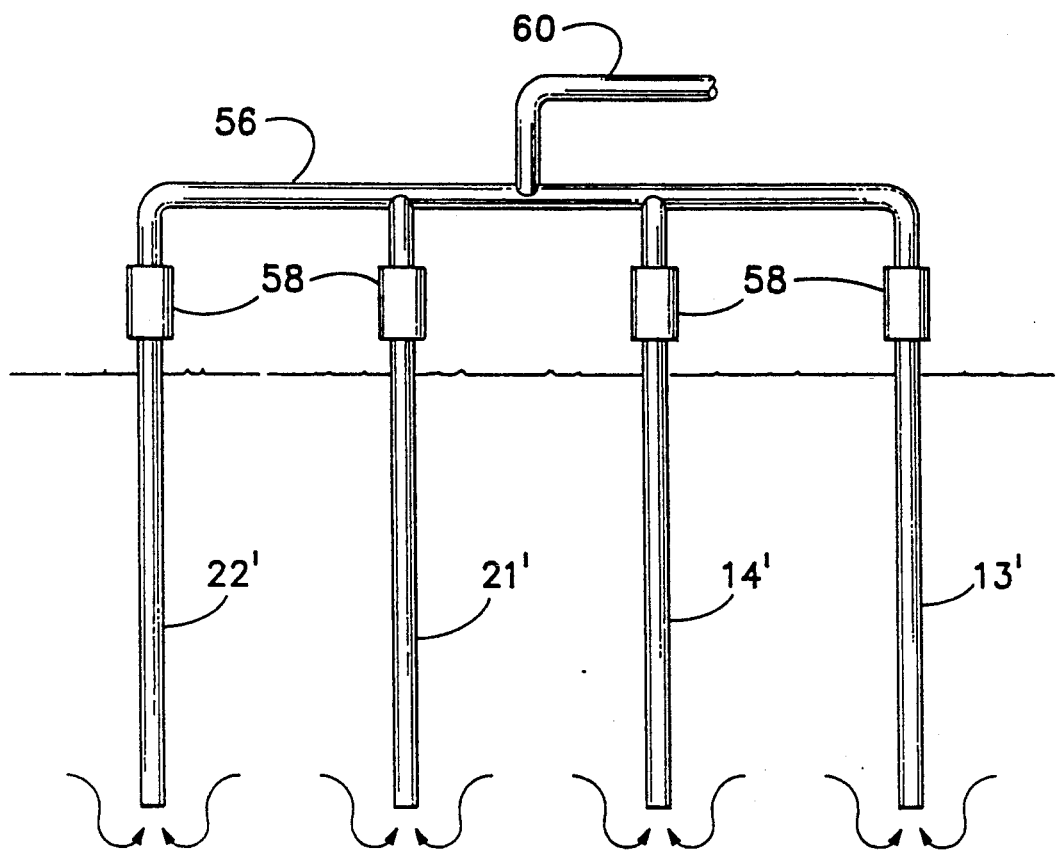
Figure 5:
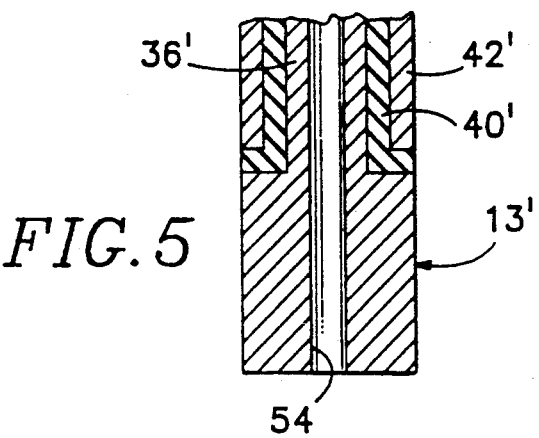

Another type of electrode is illustrated in FIGS. 4 and 5. This type of electrode as illustrated in longitudinal cross-section in FIG. 5 is similar in construction to the FIG. 3 electrode, and primed reference numerals are employed to refer to corresponding elements. however, this electrode is provided with an axial passage 54 extending the whole length thereof for communicating with a header 56 by way of insulating tube 59. Electrodes 13', 14', 21 and 22' in FIG. 4 may be successively negative and positive electrodes and are connected to power supply means by separate conductors (not shown). However, a negative pressure, i.e. vacuum, can be applied to header 56 from conduit 60 for drawing hazardous material from the ground as it is volatilized by electric heating. The conduit 60 can extend to a plant for generating the negative pressure and treating, recovering, or destroying the gaseous material removed from the ground. Alternatively, selected ones of the hollow electrodes may be connected to a source of stripping air, while other hollow electrodes may serve as means for removing stripping air from the soil being treated.

It will be appreciated the array of hollow electrodes illustrated in side view in FIG. 4 is desirably extended to a 4×4 array as illustrated in FIGS. 1 and 6, with similar connections being made thereto. Such array may or may not be provided with a covering hood 28, inasmuch as gaseous substance can be withdrawn by means of conduit 60 rather than conduits 30. However, the electrodes of FIGS. 1 and 2 may also be made hollow, i.e., to have the cross-section of FIG. 5, being provided with venting means 62 in FIG. 2 underneath hood 28 whereby the gaseous effluent is withdrawn from below the surface of the ground via the electrodes and into hood 28 so as to be withdrawn through conduits 30 in combination with gasses emitted directly upwardly through the ground surface.

Intermittent DC potential applied to the electrodes passes a series of electrical discharges between the electrodes inserted in the contaminated soil such that energy dissipated by the discharges heats the soil and volatilizes or destroys organic wastes in the soil. In general, the soil temperature should be raised to at least 150° C. above the boiling point of an organic contaminant to achieve greater than 99% removal efficiency. This means that for removal of light organics, a temperature of about 200° C. should be achieved, and for heavy organics the soil should be heated to about 500° C. or greater. Therefore, a range between 200° C. and 600° C. is preferred in order to attain good efficiency on the one hand without requiring excessive power on the other. However, it is clear some removal can take place below and above this range. The total duration of time required by the discharge regime to heat the soil to the requisite temperature sufficiently for decontamination will depend upon the individual soil content as well as on the material buried therein. Soil temperature is readily measured by conventional means and the process may be continued until the soil region is substantially out-gassed with respect to the contaminant.

Higher soil temperatures which assure destruction of hazardous chemicals are an option. Accordingly, the ground may be heated to a temperature for substantially destroying the contaminant chemicals by pyrolysis, followed by combustion of the pyrolysis products when these products reach the surface. In this case, a higher ground temperature than 600° C. is preferred, although many materials will begin to pyrolyze at 300° C. Thus, a range of 300° C. to 1200° C. is suitable for some degree of destruction of the offending materials in the ground. For achieving combustion when the pyrolysis products reach the surface, the hood 28, as illustrated in FIGS. 1 and 2, may be employed, and an additional inlet (not shown) for combustion gas is suitably provided, with the combustion products being removed via conduits 30.

As another alternative, the ground may be heated to the preferred temperature range, i.e., between 200° C. and 600° C., with destruction or other treatment taking place at an above ground location to which the offending substances are conveyed via conduits 30 and FIGS. 1 and 2 or conduit 60 in FIG. 4.

In a test for the removal of 2-chlorophenol test chemical, a removal efficiency of 95 wt. % was achieved in a run time of 4.2 hours, with an average power expenditure of 115 watts. The maximum soil temperature was 304° C. in sandy soil. Successful tests have also been conducted for test deposits of trichloroethene and hexachlorobenzene.

Figure 7:
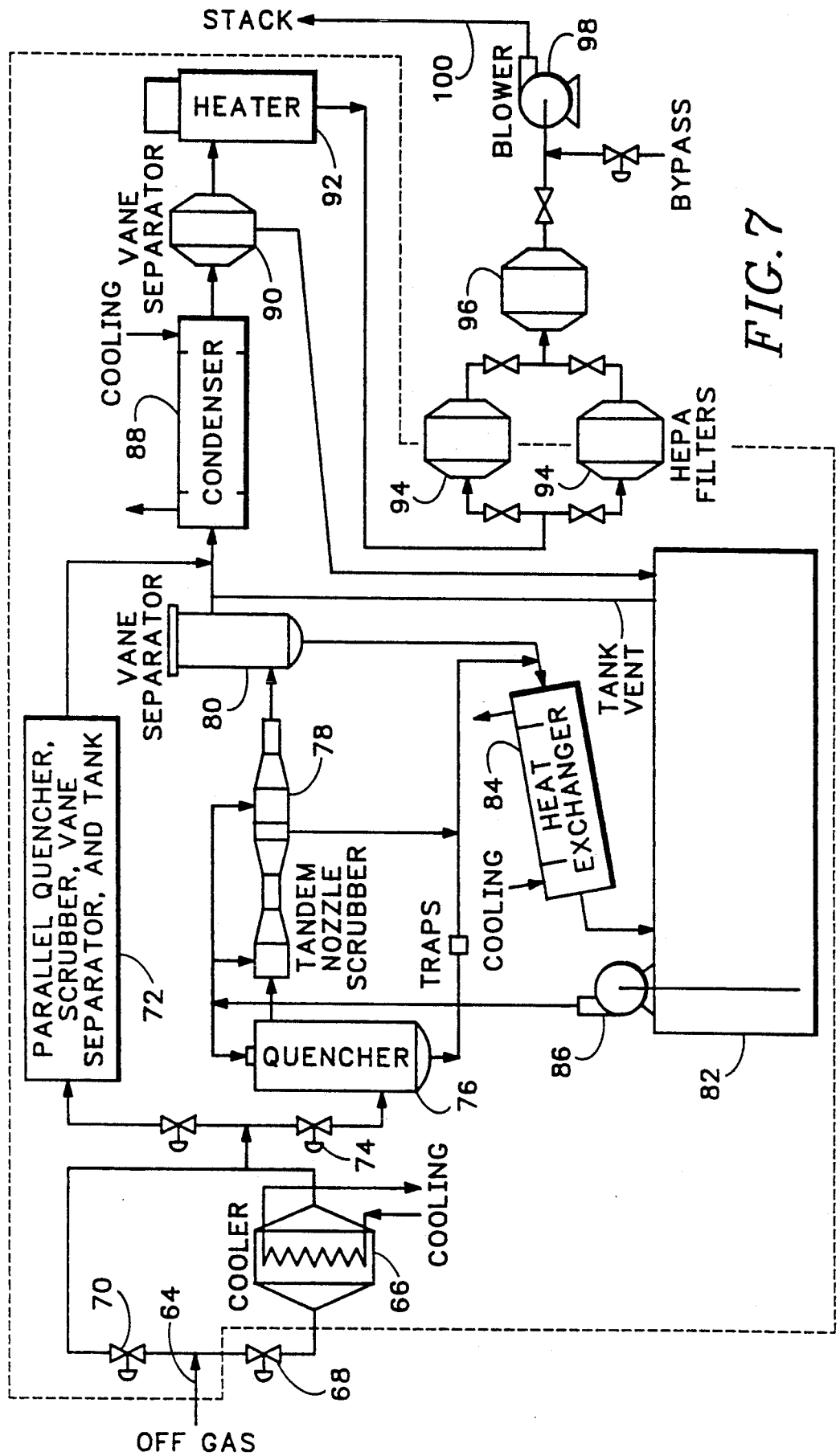

The effluent is suitably conveyed by conduits 30 in FIGS. 1 and 2, or 60 in FIG. 4 to a gas treatment, recovery, or destruction system. By way of example, a treating or cleaning system is depicted in FIG. 7 where the off gas is received at 64 either from the hood of FIGS. 1 and 2 or the header of FIG. 4. In the case of off gas received at very high temperatures, for example in the instance of combustion within hood 28, a cooler 66 is employed and comprises a finned air-to-glycol heat exchanger. This cooler can be by-passed by opening valve 70 and closing valve 68.

From the gas cooler, the off gas is suitably split and directed into one of two wet scrubber systems that operate in parallel. One such system, indicated at 72, is shown in block fashion and the other parallel system will be described. Valve 74 leads to quench tower 76 feeding tandem nozzle scrubber 78 which in turn leads to vane separator 80. The tandem nozzle scrubber may comprise a tandem nozzle hydrosonic scrubber manufactured by Hydro-Sonic Systems, Dallas, Tex. The quencher reduces the gas temperature to about 66° C., and supplies some scrubbing action to remove a portion of entrained particles. The primary functions of the tandem nozzle scrubber are to remove any remaining particles and condense remaining semivolatile components as well as to provide additional cooling of the off gas. The vane separator that follows is designed to remove all droplets greater than or equal to 12 μm.

A glycol scrub solution that is injected into the quencher and tandem nozzle scrubber from tank 82 is cooled through heat exchanger 84 before being returned to the process. After the scrub solution is returned to tank 82, it is circulated via pump 86 back to quencher 76 and scrubber 78.

Following the scrubber system, the gas is cooled in condenser 88. The condenser and mist eliminator or vane separator 90 remove droplets greater than or equal to 12 μm. Final decontamination of off-gas particulates is achieved in a two stage filter/absorber assembly following heating of the gas at 92. The first stage is composed of two parallel HEPA (high-efficiency particulate air) filters and charcoal absorber 94 feeding a single HEPA filter and charcoal absorber 96.

The gaseous effluents are drawn through the off-gas system components by an induced draft system, the driving force being provided by a blower 98. This blower, which has substantial capacity, is employed to provide negative pressure within hood 28 or within header 56 and the hollow electrodes for aiding in removing gaseous products from the ground. After passing through the blower system, the off-gasses are exhausted to a stack which is indicated at 100.

The system of FIG. 7 is somewhat conventional and it is understood it could be replaced by other gas treatment systems. It may be used alternatively in conjunction with a destruction system comprising controlled air incinerators coupled between the ground site being detoxified and the off-gas system of FIG. 7, particularly in the case where combustion within the hood 28 is not being carried out. Alternatively, ground chemicals may be recovered in a cryogenically cooled condenser or air exchange condenser prior to delivery to the off-gas system of FIG. 7. Various combinations of gas treating systems of this type can be employed.

As an alternative embodiment, a continuous conduction system may be employed with the electrode configuration depicted in FIGS. 1 and 2, wherein an electrically conductive heavy oil is sprayed, inserted or injected into the ground for supporting conduction between the electrodes before power is applied. A higher current, lower voltage source of power is employed in such case. The voltage utilized is suitably between 1,000 and 4,000 volts, for supporting a current in the ground between electrodes of between 1600 amps and 450 amps. The electrically conductive fluid is suitably sprayed on or inserted into the soil to be treated, so that it is absorbed evenly into the soil, and the electrodes are then inserted into the soil. The electrical conductivity of the fluid will allow sufficient current to pass among the electrodes to dissipate substantial heat in the soil. This method is suitable for heating volumes of soil to relatively low temperatures, e.g. less than 200° C. The first described method, (i.e., utilizing high potential arc discharge, e.g. 100 to 2,000 kilovolts), is preferred for several reasons. High temperatures can be more easily reached without the introduction of conductive materials and, moreover, the high potential arcing is less dependent upon soil types, i.e., less dependent upon the absorption of the conducting medium in the soil and the appropriate distribution of the conducting medium through the soil.

As a further alternative embodiment, high potential intermittent arcing may be followed by more continuous arcing with a suitable power supply. Source 30 may in such case take the form of an impulse source and a somewhat lower voltage parallel source capable of delivering greater and substantially continuous arcing current.

The electrodes as illustrated in FIGS. 3 through 5, as used in a system for heating the soil, are effective in concentrating the electrical discharge, at least initially, below the soil surface to avoid superficial treatment. Electrodes of the same type may be employed for initially reaching levels below the ground in the higher temperature, in-situ vitrification process, especially when such electrodes are formed of materials hereinafter described which are adapted to withstand higher operating temperatures for at least a predetermined time period.

Figure 8:
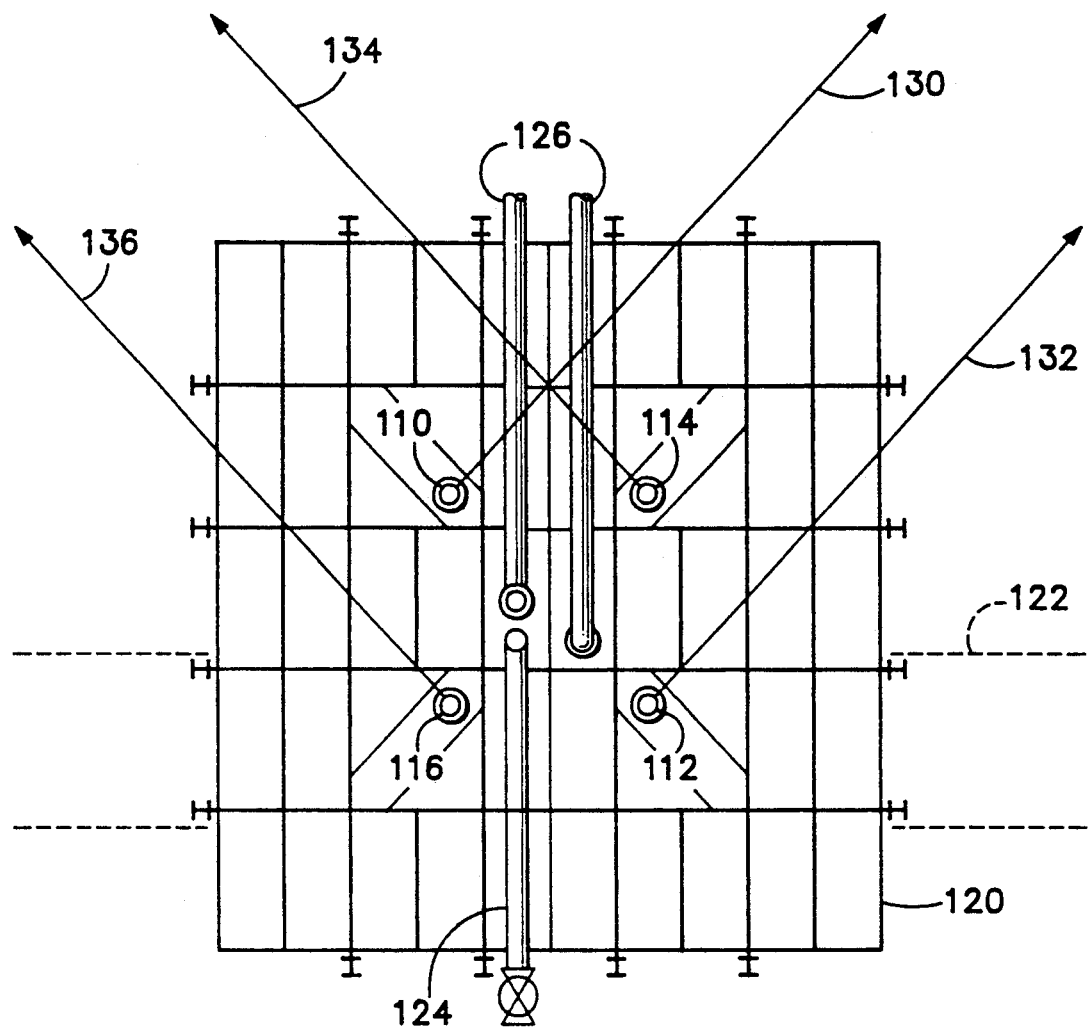
Figure 9:
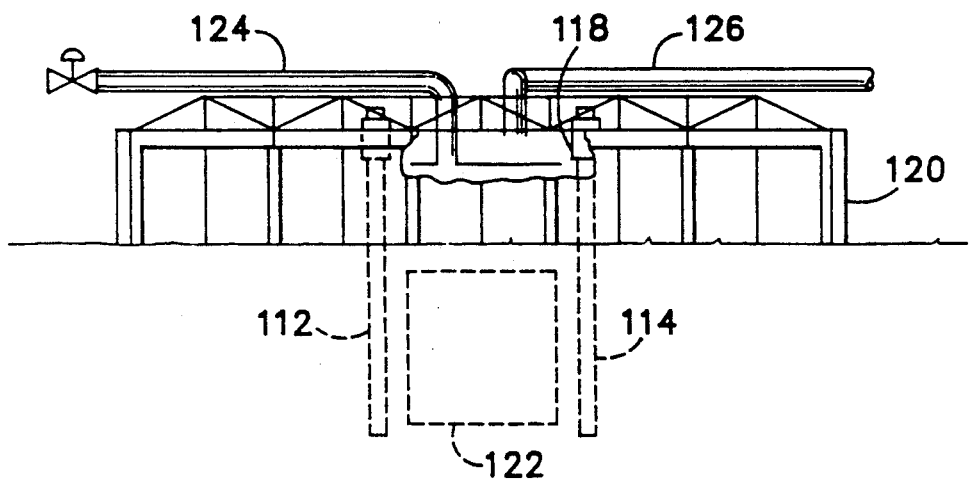
Figure 10:
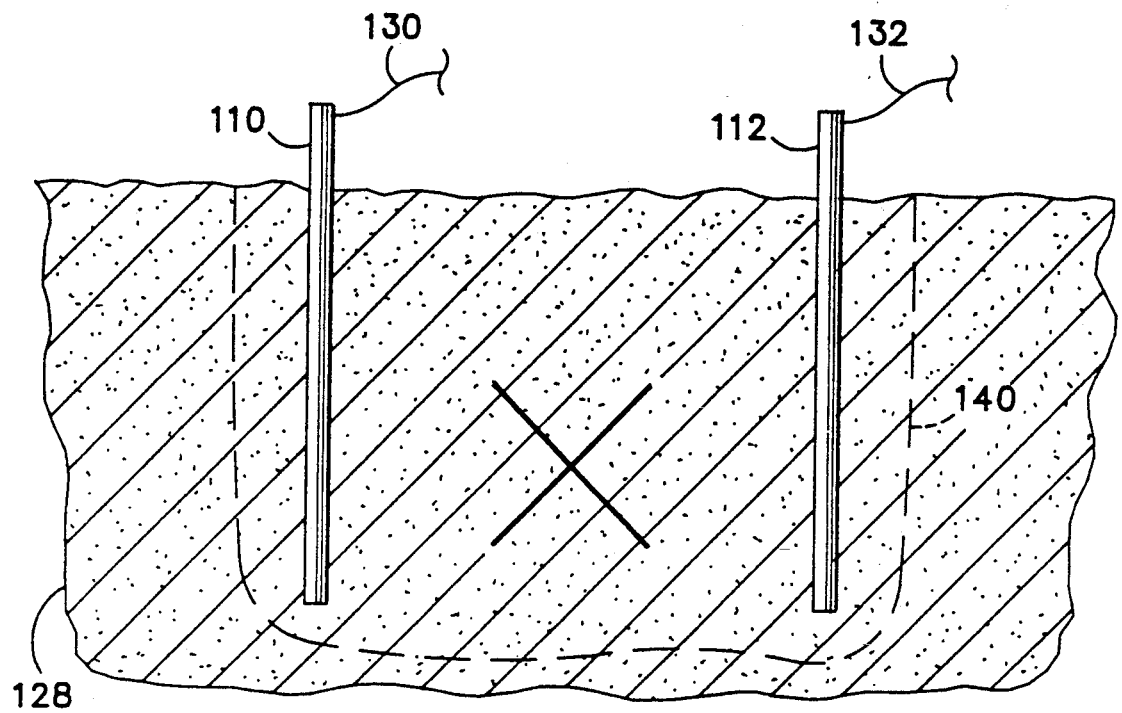

Considering the process of in-situ vitrification generally, reference is first made to FIGS. 8-10 illustrating an in-situ vitrification installation. A plurality of substantially vertically disposed electrodes, 110, 112, 114 and 116 are supported via insulating feedthroughs 118 from the roof of portable hood 120. Hood 120, which is typically about twelve to eighteen meters square by two meters high, is movable with respect to the ground and may be placed over a section of buried trench or the like 122 containing waste materials. The hood is also equipped with a combustion air inlet system 124 and off-gas outlets 126 connected with the top interior of the hood. The off-gas outlets suitably lead to a gas treating or scrubbing system.

The electrodes 110-116 are placed in the ground, with first electrodes 110 and 112 on opposite sides of the trench being connected via conductors 130 and 132 respectively to a first phase of current, while second electrodes 114 and 116, also disposed on opposite sides of the trench, are connected by way of conductors 134 and 136 respectively to a second phase of current. The conductors 130-136 may be joined to the respective electrodes by connector clamps (not shown). Suitably, the apparatus is electrically supplied by way of a transportable power substation delivering three-phase power to transformers in a Scott connection for providing two-phase current to conductors 130-132 and 134-136 respectively. Adjustable means may be included for determining the desired voltage and current levels. A load voltage between approximately 4,000 and 400 volts is suitably supplied with a corresponding current capacity on each of two phases of between 450 and 4,000 amps. In tests, the final voltage is typically 700 to 600 volts delivering a current between 2,000 and 3,000 amperes.

In-situ vitrification is further illustrated schematically in FIG. 10. Electrodes 110 and 112 are disposed vertically on either side of or within a region of buried waste material represented by a large X. For starting the soil melting process, a horizontal layer of graphite or glass frit, which may be buried below the surface of the ground and over the waste material, can be placed between the two electrodes in contacting relation thereto. A voltage of a few hundred volts is applied between conductors 130 and 132 causing conduction and an elevation in the temperature. A current-carrying liquid glass Pool 140 is established which progressively enlarges both laterally and vertically downwardly in a typical instance, engulfing the waste materials. The temperature of the pool is typically above 1200° C. The waste materials are melted, pyrolyzed or dissolved in the molten soil mass. Metals within the mass may be dissolved or may eventually be found as solid portions at the lower boundary of the glass pool. When the glass pool reaches a desired depth, current flow is typically discontinued after which the pool forms a vitrified mass as a glass, a glass ceramic, or a partially devitrified glass, with crystals and glass dispersed within a solid matrix.

Figure 11:
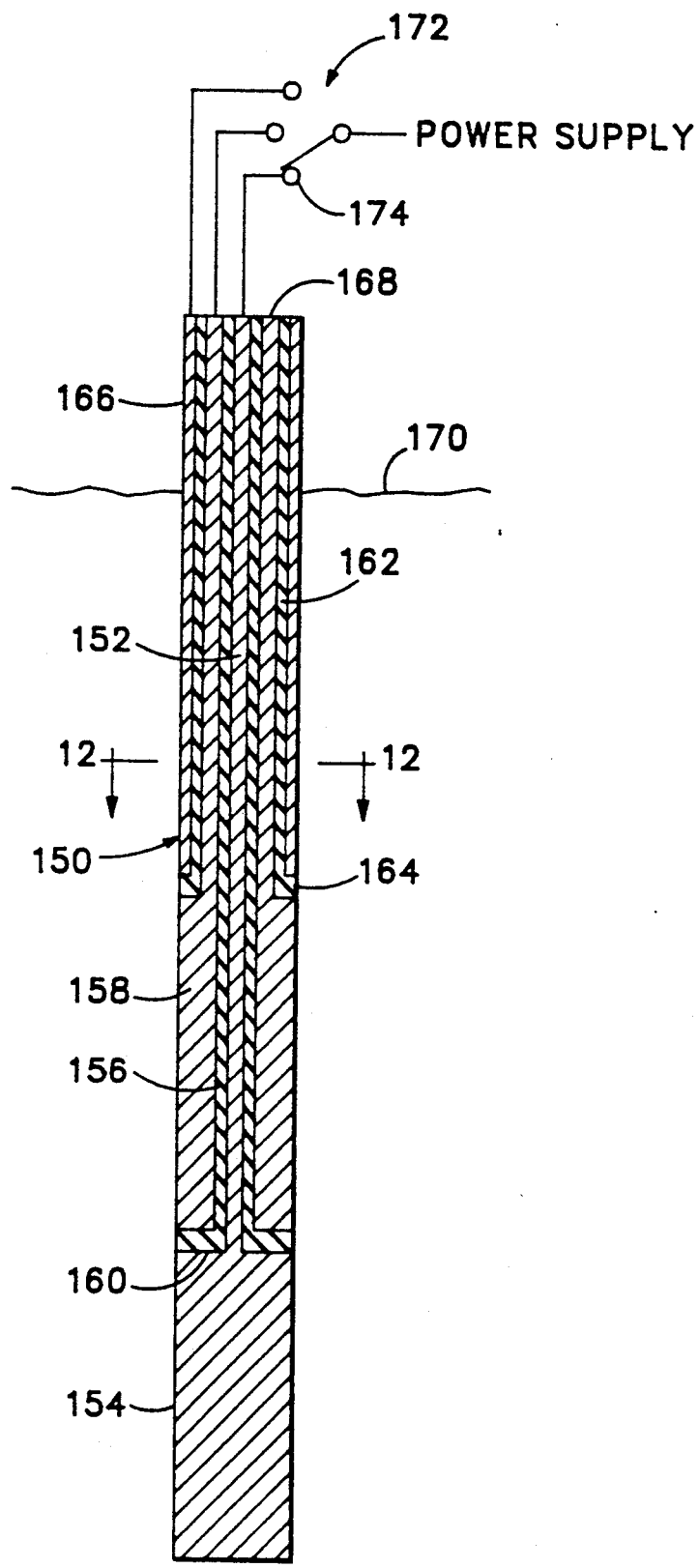

Further electrodes according to the present invention which are particularly adapted for use in in-situ vitrification are illustrated in FIGS. 11–15. It is understood in each case that one or more pairs of such electrodes will be employed in spaced relation on either side of or within the area to be vitrified. Referring particularly to FIG. 11 showing such an electrode in vertical cross-section, the electrode 150 is cylindrical, including an inner axial conductive metal electrode portion 152 having an enlarged cylindrical tip 154 at its lower extremity. The inner axial portion 152 is covered by an insulating sleeve 156, while disposed over insulating sleeve 156 is a further cylindrical conductive metal sleeve 158, the lower end of which has the same outside diameter as electrode tip 154. However, metal sleeve 158 is separated from tip 154 by radial insulating flange 160 which is the same in outside diameter as tip 154.

Metal sleeve 158 toward the upper portion thereof is smaller in diameter than the aforementioned 154 and is covered by a further insulating sleeve 162 having a lower end which terminates in a radial flange 164 of the same outside diameter as the rest of the electrode, i.e., the same outside diameter as tip 154. In surrounding relation to insulating sleeve 162, above flange 164, a cylindrical conductive metal covering sleeve 166 is received.

The various metal sleeves 152, 158 and 166 are concentric and all suitably terminate at an upper end 168 above soil level 170, the electrode 50 being supported by an insulating feedthrough 18 (FIG. 9). The sleeves 152, 158 and 156 are connected to fixed terminals of a selection switch 72 having a movable terminal coupled to a power supply.

By first operating switch 172 so that its movable terminal contacts terminal 174, current from the power supply is delivered to electrode tip 54 in preference to the other electrode portions for the purpose of initially directing current flow through the ground below ground level 170. It is assumed that another electrode or other electrodes employed simultaneously in circuit with electrode 50 are similarly constructed and arranged so that a lower portion is preferentially operative.

Figure 12:
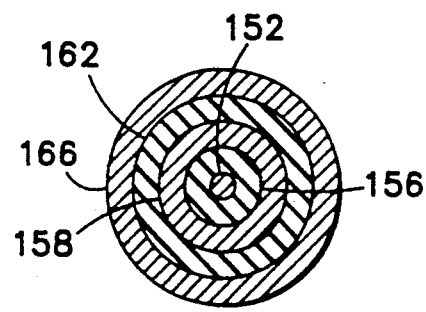

After melting the soil in the area between the similar electrodes, switch 172 (and a corresponding switch on a cooperating electrode) can be moved to the middle contact whereby current will then flow from electrode sleeve portion 158, and finally, after desired soil melting at this level, the switch arm is positioned at the top terminal such that soil at the surface is melted between corresponding electrode sleeve portions 166. Although the upper portion of sleeve 166 is exposed to the air, nevertheless it will not have been connected to a source of power while the lower portions of the electrode were selected and therefore its integrity is preserved for a longer time period. As will be seen, the electrode of FIGS. 11 and 12 is similar to the electrode of FIG. 3 but has additional switchable sections for gradually moving conduction closer to the surface.

Figure 13:
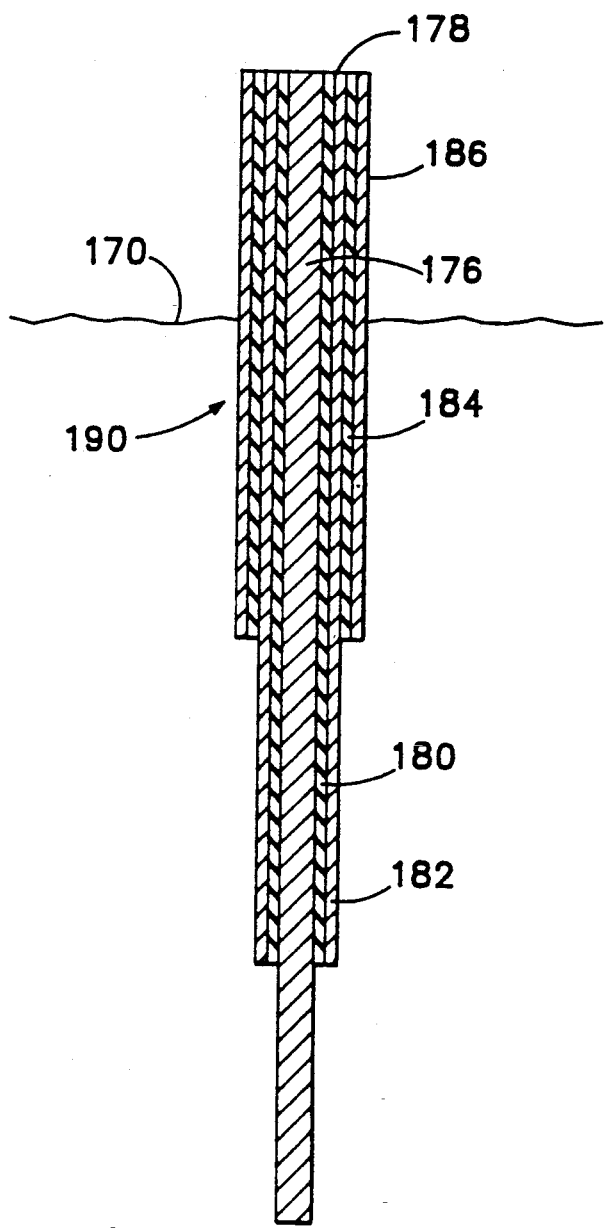

Another electrode according to the present invention suitable for in-situ vitrification is illustrated at 190 in FIG. 13. This electrode is similar in construction and operation to the electrode as shown in FIGS. 11 and 12 and a similar switching means can be connected thereto. A first inner axial electrode portion 176 takes the form of a cylindrical conductive metal rod covered over approximately two-thirds of its length, starting from upper end 178, with an insulating sleeve 180, the latter being received within a cylindrical conductive metal sleeve 182 coextensive with sleeve 180. Adhered in surrounding relation to metal electrode sleeve 182 is a further insulating sleeve 184 which is coextensive with electrode portion 182 starting from the top thereof and extending over about two-thirds of the length of electrode portion 182. An additional cylindrical conducting electrode sleeve 186 covers insulating sleeve 184 for completing the concentric configuration. Electrode 190 of FIG. 13 is operable in substantially the same way as electrode 150 depicts in FIGS. 11 and 12 but is somewhat simpler to manufacture. However, it will be appreciated electrode 150 is easier to drive into the ground.

Figure 14:
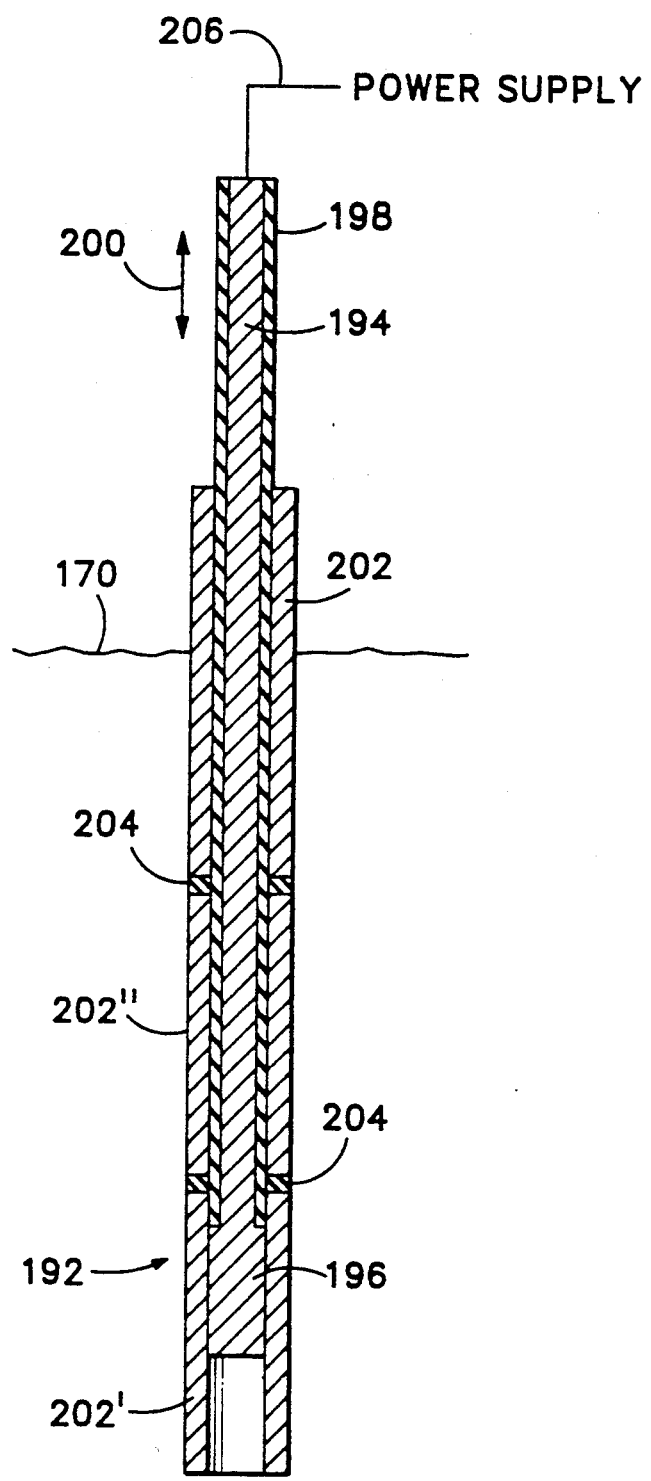

A further electrode according to the present invention is illustrated at 192 in FIG. 14. This cylindrical electrode includes a movable inner axial portion 194 in the form of a conductive metal rod provided with an enlarged cylindrical tip 196 at its lower extremity. Above tip 196, axial portion 194 is covered with a cylindrical insulating sleeve 198 having the same outside diameter as the aforementioned lower tip 196. The structure including electrode portion 194 and sleeve 198 is movable as a unit upwardly and downwardly as indicated by arrow 200 closely within cylindrical conductive metal sleeve 202 which is divided into an upper section 202, a middle section 202" and a lower section 202' by intermediate insulating disks 204 respectively adhered to cylindrical metal sections of sleeve 202 immediately thereabove and therebelow.

As illustrated in FIG. 14, the electrode portion 194 is connectable to a power supply via lead 204 such that for the position illustrated power is coupled to lower cylindrical metal sleeve portion 202' inasmuch as enlarged tip 196 makes contact therewith. However, if rod 194 is upraised until tip 196 resides entirely between the insulating disks 204, then the power supply will be connected solely to electrode portion 202". Similarly, if the central rod is raised even farther so that tip 196 is entirely above both disks 204, the electrical connection will be to the upper part of metal electrode sleeve 202. As will be seen, a selective connection can thus be made with different levels of sleeve 202, e.g. starting at a lower level whereby electrical current is directed through a lower region in the ground, after which the central rod is raised to deliver electrical current to regions closer to the surface. A gradual change can be made between regions by positioning tip 196 so that it bridges, for example, between electrode sections 202' and 202".

The electrode of FIG. 14 is suitably mounted with the upper portion of electrode sleeve 202 received within feedthrough 118 in FIG. 9, with the upper end of rod 194 and its accompanying insulating sleeve 198 extending above the same feedthrough 118. The entire length of electrode portion 194 and tip 196 may therefore be somewhat longer than the entire length of sleeve 202.

Figure 15:
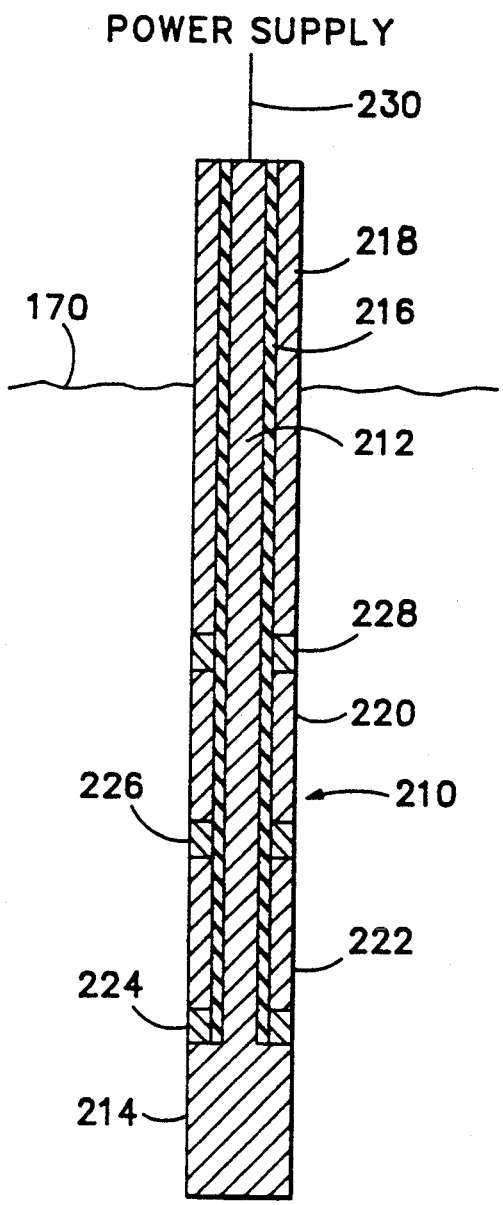

A further in-situ vitrification electrode embodiment is illustrated in FIG. 15 wherein a cylindrical electrode 210 includes an inner axial electrode portion 212 comprising a conductive metal rod provided with an enlarged cylindrical tip 214 at its lower extremity. The inner axial portion above tip 214 is covered by a cylindrical insulating sleeve 216 which is in turn received within an upper cylindrical conductive metal electrode portion 218 as well as within a central cylindrical conductive metal electrode portion 220 and a lower cylindrical conductive metal electrode portion 222 all adhered to sleeve 216 and having the same outside diameter as tip 214. Lower cylindrical electrode portion 222 is separated from lower tip 214 by an annular metal disk 224 which is the same in outside diameter as tip 214. The inner rod 212 and the cylindrical electrode portion 222 are electrically connected via disk 224. Furthermore, electrode portions 220 and 222 are separated and electrically connected by a similar annular metal disk 226, while the same type of metal disk 228 separates electrode portions 218 and 220. The combination of cylindrical electrode portions 218, 220 and 222 together with annular metal disks 224, 226 and 228 are coextensive with the axial electrode portion 212 having its upper end connected to a power supply by means of lead 230.

The operation of electrode 210 in FIG. 15 is generally the reverse of the operation described in connection with the electrodes of FIGS. 11-14 in that conduction through the ground between a pair of electrodes 210 will at first more likely occur nearer the surface of the ground, or at least not preferentially at a distance from ground surface 170. This will be especially true if a layer of graphite and glass frit just below the ground surface is used for starting conduction. Annular metal disks 228 are formed of a conductive metal having a lower melting point than electrode portions 218, 220 and 222 and each disk is adapted to melt when the ground therearound reaches a given temperature. Assuming the ground near surface 170 melts first and melting proceeds downwardly toward annular metal sleeve 228, the annular metal disk 228 will melt whereby current cannot then reach annular electrode portion 218 but will be concentrated toward lower annular electrode portions 220 and 222. When the extent of melting reaches a lower level, annular metal disk 226 will also melt such that conduction will takes place via sleeve portion 222 and tip 214. Subsequent melting of annular disk 224 will, of course, concentrate conduction in the region of tip 214. Although conduction may thus start toward the upper part of the electrode, it should be apparent that, during the course of operation, current will become concentrated farther downwardly whereby upper portions of the electrode will be protected and solely superficial treatment is avoided.

In the case of the electrodes illustrated in FIGS. 3-5 and 11-15 used for in-situ vitrification purposes, the conductive metal portions are formed of conductive metal adapted to withstand the higher temperatures involved, e.g. such conductive metal portions are suitably molybdenum or graphite, with the exception of annular metal disks 224, 226 and 228 of FIG. 15 which may be formed of copper. The insulating material in the electrodes as used for in-situ vitrification is a suitable refractory material, e.g. a high temperature ceramic comprising or containing alumina. While the electrodes of FIGS. 11-15 have their primary utility in connection with in-situ vitrification, and are described in connection therewith, the same electrode structures can also be used for the in-situ heating process if desired.

While several embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. Apparatus for detoxifying waste sites and the like containing hazardous volatilizable material, said apparatus comprising:
 a plurality of electrodes inserted at spaced points in the ground proximate a said waste site, said electrodes comprising at least a pair extending downwardly and on opposite sides of at least a portion of the waste at said site to a depth commensurate with the depth of said waste, said electrodes being in direct contact with said ground at their point of insertion and therebelow,
 means for applying a voltage between said pair of electrodes to cause a current flow through the ground region therebetween adjacent the soil surface for raising the temperature of said ground region to between 100° and 1200° C. to volatilize said material without melting the ground, and
 means for collecting said material as volatilized.

2. The apparatus according to claim 1 wherein said means for applying a voltage provides a voltage in the range of 100 to 2000 kilovolts DC between said pair of said electrodes for heating the ground by DC arcing for a sufficient period of time to raise said temperature of said ground region to between 100° and 1200° C.

3. The apparatus according to claim 2 wherein said means for applying a voltage comprises an impulse generator and includes a capacitor bank.

4. The apparatus according to claim 2 further including switch means for switching application of voltage between various pairs of electrodes.

5. The apparatus according to claim 1 wherein at least ones of said electrodes include an active portion adapted to be positioned substantially below ground level and an insulated portion thereabove for concentrating current flow between active portions of said electrodes in the region of said waste below the surface of the ground.

6. The apparatus according to claim 5 including means for partially withdrawing at least ones of said electrodes from the ground in order to provide heating at successively shallower levels.

7. The apparatus according to claim 5 wherein said at least ones of said electrodes are metal and cylindrical in shape having a said active lower portion exposed to the ground below the ground surface, and further including an insulating sleeve immediately thereabove in surrounding relation to the electrode to provide said insulating portion.

8. The apparatus according to claim 7 wherein said electrode is larger in diameter at said active lower portion and is indented thereabove to receive said sleeve.

9. The apparatus according to claim 8 wherein the said electrode is further provided with a metal sleeve disposed over said insulating sleeve, said metal sleeve being substantially the same in outside diameter as said active lower portion, said insulating sleeve having a radial flange separating said metal sleeve from said active lower portion wherein the outside diameter of said radial flange is also approximately the same as said active lower portion.

10. The apparatus according to claim 9 wherein said metal sleeve is slidable on said insulating sleeve in a direction axial of said electrode.

11. The apparatus according to claim 1 wherein said means for collecting said material comprises a hood positioned on the ground proximate said site.

12. The apparatus according to claim 1 wherein said electrodes are at least partially supported from said hood.

13. The apparatus according to claim 1 wherein at least ones of said electrodes are hollow, the passage therewithin comprising said means for collecting said material.

14. The apparatus according to claim 13 further including a header joining hollow electrodes for collecting said material.

15. The apparatus according to claim 1 including means for maintaining a negative pressure with respect to said means for collecting said material.

16. The apparatus according to claim 1 wherein said means for applying a voltage between a pair of electrodes causes a current flow for raising the temperature to between 200° and 600° C.

17. The apparatus according to claim 1 wherein said means for applying a voltage provides a voltage in the range of 100 to 2000 kilovolts between said pair of electrodes, followed by continuous discharge of current at reduced voltages and increased currents to raise said temperature of said ground region to said between 100° and 1200° C.

18. The apparatus according to claim 17 wherein said means for applying a voltage comprises an impulse generator and includes power supply means for maintaining substantially continuous discharge at lower voltage levels.

19. The apparatus according to claim 1 wherein at least ones of said electrodes are hollow, the passage within at least one of said electrodes comprising means for providing stripping air to soil being treated, and the passage within at least another of said electrodes comprising means for removing stripping air.

20. An electrode for insertion in the ground to apply electric current thereto, said electrode including an active lower portion adapted to be positioned substantially below ground level for concentrating electric current at a lower level well below the surface of the ground and an insulated portion thereabove extending substantially below ground level, said electrode being metal and cylindrical and including an insulating sleeve in surrounding relation to said electrode to provide said insulated portion,
wherein said electrode is larger in diameter at said active lower portion and is indented thereabove to receive said sleeve, and
wherein the said electrode is further provided with a metal sleeve disposed over said insulating sleeve, said metal sleeve being substantially the same in outside diameter as said active lower portion, said insulating sleeve having a radial flange separating said metal sleeve from said active lower portion wherein the outside diameter of said radial flange is also approximately the same as said active lower portion.

21. An electrode according to claim 20 wherein said metal sleeve is slidable on said insulating sleeve in a direction axial of said electrode.

22. An electrode according to claim 20 wherein said electrode is hollow, the passage therewithin comprising means for providing a gas passage into the ground.

23. An electrode according to claim 20 including means for withdrawing said electrode from the ground.

24. An electrode for insertion in the ground to apply electric current thereto, said electrode including an active lower portion adapted to be positioned substantially below ground level for concentrating electric current at a lower level well below the surface of the ground and an insulated portion thereabove extending substantially below ground level, said electrode being metal and cylindrical and including an insulating sleeve in surrounding relation to said electrode to provide said insulated portion,
said electrode further including at lest one metal sleeve in surrounding relation to said insulating sleeve, and means for selectively directing current as between said metal sleeve and said lower portion.

25. An electrode according to claim 24 wherein said metal sleeve is spaced upwardly along said electrode from said lower portion.

26. An electrode according to claim 25 wherein said insulating sleeve is indented to receive said metal sleeve.

27. An electrode according to claim 26 wherein said metal sleeve is indented upwardly along said electrode to receive a further insulating sleeve and another metal sleeve thereover, said means for directing current being effective for selectively directing current to the last mentioned metal sleeve.

28. An electrode for inserting in the ground to apply electric current thereto, said electrode comprising:
an inner rod portion adapted to be connected to a source of current, and
an outer cylindrical portion within which said rod portion is slidably received, said outer cylindrical portion including plural metal sections and insulating means separating said metal sections,
said inner rod portion being insulated from said outer cylindrical portion except for a lower part thereof where electrical contact is selectively made with said metal sections descending upon the slidable position of said rod portion within said cylindrical portion.

29. An electrode according to claim 28 wherein the lower part of said inner rod portion slidably mates within said cylindrical portion, said inner rod portion being indented thereabove to receive insulation.

30. An electrode for insertion in the ground to apply electric current thereto, said electrode comprising:
an inner rod portion adapted to be connected to a source of current, said rod portion being provided with an active lower portion,
an outer cylindrical portion within which said rod portion is received, said outer cylindrical portion being formed from sections comprising a first metal separated by sections of a second metal having a lower melting point than said first metal, and insulating means separating said inner rod portion from said outer cylindrical portion except toward said active lower portion where said outer cylindrical portion is connected to said inner rod portion.

31. An electrode according to claim 30 wherein said active lower portion is larger in diameter than said rod portion thereabove, said outer cylindrical portion including a section of lower melting point metal adjoining said active lower portion of said rod portion to provide connection to the inner rod portion.

* * * * *